US007301334B2

(12) United States Patent
Shen et al.

(10) Patent No.: US 7,301,334 B2
(45) Date of Patent: Nov. 27, 2007

(54) MICRO MAGNETIC PROXIMITY SENSOR SYSTEM

(75) Inventors: Jun Shen, Phoenix, AZ (US); Meichun Ruan, Tempe, AZ (US); Chengping Wei, Gilbert, AZ (US)

(73) Assignee: Schneider Electric Industries SAS (FR)

(*) Notice: Subject to any disclaimer, the term of this patent is extended or adjusted under 35 U.S.C. 154(b) by 0 days.

(21) Appl. No.: 11/447,288

(22) Filed: Jun. 6, 2006

(65) Prior Publication Data

US 2007/0007952 A1 Jan. 11, 2007

Related U.S. Application Data

(63) Continuation of application No. 10/418,076, filed on Apr. 18, 2003, now abandoned, and a continuation-in-part of application No. 10/058,940, filed on Jan. 28, 2002, now Pat. No. 6,633,158.

(60) Provisional application No. 60/373,605, filed on Apr. 19, 2002, provisional application No. 60/322,841, filed on Sep. 17, 2001.

(51) Int. Cl.
*G01B 7/14* (2006.01)

(52) U.S. Cl. .................. 324/207.26; 335/124; 257/421

(58) Field of Classification Search ........... 324/207.26, 324/207.14, 252, 260; 335/124, 128; 257/421, 257/537

See application file for complete search history.

(56) References Cited

U.S. PATENT DOCUMENTS

| | | | |
|---|---|---|---|
| 4,503,922 | A | 3/1985 | Brosh et al. |
| 4,793,241 | A | 12/1988 | Mano et al. |
| 5,430,421 | A | 7/1995 | Bornand et al. |
| 5,557,132 | A | 9/1996 | Takahashi |
| 5,605,614 | A | 2/1997 | Bornand |
| 6,040,748 | A | 3/2000 | Gueissaz |
| 6,124,650 | A | 9/2000 | Bishop et al. |
| 6,153,839 | A | 11/2000 | Zavracky et al. |
| 6,384,353 | B1 | 5/2002 | Huang et al. |
| 6,483,056 | B2 | 11/2002 | Hyman et al. |
| 6,492,887 | B1 | 12/2002 | Diem et al. |
| 6,496,612 | B1 | 12/2002 | Ruan et al. |
| 6,633,158 | B1 | 10/2003 | Shen et al. |
| 6,633,212 | B1 | 10/2003 | Ruan et al. |
| 2002/0050880 | A1 | 5/2002 | Ruan et al. |
| 2002/0050881 | A1 | 5/2002 | Hyman et al. |
| 2003/0173957 | A1 | 9/2003 | Shen et al. |

OTHER PUBLICATIONS

U.S. Appl. No. 60/332,841, "Magnetic Proximity Sensors," filed Sep. 17, 2001.

Gueissaz, F. and Piguet, D., "The Microreed, and Ultra-Small Passive MEMS Magnetic Proximity Sensor Designed for Portable Applications," IEEE, 2001, pp. 269-273.

*Primary Examiner*—Jay M Patidar
(74) *Attorney, Agent, or Firm*—Sterne, Kessler, Goldstein & Fox PLLC

(57) ABSTRACT

A system that senses proximity includes a magnet producing a magnetic field and a sensor having a switch. The switch includes a cantilever supported by a supporting structure. The cantilever has a magnetic material and a longitudinal axis. The magnetic material makes the cantilever sensitive to the magnetic field, such that the cantilever is configured to move between first and second states. The switch also includes contacts supported by the support structure. The switch can be configured as a reed switch. When the magnet moves relative to the sensor, the cantilever interacts with a respective one of the contacts based on the position of the magnet during movement.

14 Claims, 10 Drawing Sheets

MICRO MAGNETIC PROXIMITY SENSOR SYSTEM

CROSS-REFERENCE TO RELATED APPLICATIONS

This application is a continuation of U.S. application Ser. No. 10/418,076, filed Apr. 18, 2003 now abandoned, which claims the benefit under 35 U.S.C. §119(e) to U.S. Provisional Application No. 60/373,605, filed Apr. 19, 2002, which is incorporated by reference herein in its entirety. U.S. application Ser. No. 10/418,076 is a continuation-in-part of U.S. application Ser. No. 10/058,940 (now U.S. Pat. No. 6,633,158 that issued Oct. 14, 2003), filed on Jan. 28, 2002, which claims priority to U.S. Provisional Application No. 60/322,841, filed on Sep. 17, 2001, which are both incorporated herein by reference in their entirety.

BACKGROUND OF THE INVENTION

1. Field of the Invention

The present invention relates to proximity sensors.

2. Background Art

Switches are typically electrically controlled two-state devices that open and close contacts to effect operation of devices in an electrical or optical circuit. Relays, for example, typically function as switches that activate or de-activate portions of electrical, optical or other devices. Relays are commonly used in many applications including telecommunications, radio frequency (RF) communications, portable electronics, consumer and industrial electronics, aerospace, and other systems. More recently, optical switches have been used to switch optical signals (such as those in optical communication systems) from one path to another.

Although the earliest relays were mechanical or solid-state devices, recent developments in micro-electro-mechanical systems (MEMS) technologies and microelectronics manufacturing have made micro-electrostatic and micro-magnetic switches possible. MEMS switches enjoy the low signal loss and good isolation associated with mechanical switches, and the high switching speeds, low power consumption, and compactness of semiconductor switches.

Micro-magnetic switches typically include an electromagnet that, when energized, causes a cantilever to make or break an electrical contact. Because the switching function depends upon movement of a cantilever, MEMS switches must be packaged so that the cantilever is free to move to perform its function. Often this precludes the use of conventional microelectronic packaging techniques for MEMS devices, or requires that these techniques be modified. Such packaging considerations can complicate fabrication processes and increase costs.

Conventional micro-magnetic switches have other disadvantages. Typically, a spring or other mechanical force is used to restore the cantilever to its quiescent position when the electromagnet is deenergized. Thus, such switches are characterized as having only a single stable position (i.e., the quiescent state) and lack a latching capability (i.e., they do not retain a given position when power has been removed from the electromagnet). Furthermore, the spring required to restore the cantilever to its quiescent position can degrade or break over time.

Non-latching micro-magnetic switches are known. These switches include a permanent magnet and an electromagnet. The electromagnet is used to generate a magnetic field that intermittently opposes the field produced by the permanent magnet. Thus, the electromagnet must consume power to maintain the cantilever in at least one of the available positions. The power required to generate this opposing field can be significant. Such power requirements can reduce the desirability of such switches for use in space, portable electronics, and other applications that demand low power consumption.

The basic elements of a latching micro-magnetic switch include a permanent magnet, a substrate, an electromagnet, and a cantilever. The cantilever is at least partially made of a soft magnetic material so that the cantilever can retain a given position when power has been removed from the electromagnet. In an optimal configuration, the permanent magnet produces a static magnetic field that is substantially perpendicular to the plane of the cantilever.

Generally, proximity sensors are devices that include circuitry for sensing change in a magnetic, electric, or optical field. In most applications, these proximity sensors are designed to only detect when an object is in a general area of the sensor, but have no other functionality. Typically, these sensors are not sufficiently versatile to provide a proximity sensing for a variety of different applications.

However, the magnetic field lines produced by a regularly shaped permanent magnet (e.g., disk, square, etc.) may not necessarily be perpendicular to the plane of the cantilever. This is especially likely near the edges of the permanent magnet. Components of the magnetic field produced by the permanent magnet that are not substantially perpendicular to the plane of the cantilever can eliminate one of its bistable positions or greatly increase the current that is needed to switch the cantilever from one position to another.

Therefore, what is needed is a micro magnetic proximity sensor that is versatile and can be used in a variety of applications with only slight modification, that is relatively easy to fabricate and use, that can sense very small or very short distances, and that is capable of sensing direction of movement, distance, proximity, velocity, acceleration, and other relative characteristics between an detected object and the sensor.

BRIEF SUMMARY OF THE INVENTION

A micro magnetic proximity sensor is provided that is versatile and can be used in a variety of applications with only slight modification, that is relatively easy to fabricate and use, that can sense very small or very short distances, and that is capable of sensing direction of movement, distance, proximity, and other relative characteristics between an detected object and the sensor.

Embodiments of the micro-magnetic proximity sensor of the present invention can be used for a wide range of products including control systems, security systems, automobile systems, household and industrial appliances, consumer electronics, military hardware, medical devices and vehicles of all types, just to name a few broad categories of goods. The micro-magnetic proximity sensor of the present invention can have the advantages of compactness, simplicity of fabrication, flexibility in design, and can have multiple functionalities.

Embodiments of the micro-magnetic proximity sensor of the present invention can include many advantages and features. One advantage can be that the sensor has multiple functionalities, such as it can: (1) be used to detect distance to an object; (2) be used to detect direction of a moving object; (3) include a memory that stores a last location of an object; (4) detect ferromagnetic-based materials and hard or soft magnetic objects; (5) be used to detect velocity and/or acceleration of an object; and/or (6) be modified to include any function desired by a user.

Embodiments of the present invention provide a proximity sensing system including a magnet producing a magnetic field and a sensor having a switch. The switch includes a cantilever supported by a supporting structure. The cantilever has a magnetic material and a longitudinal axis. The magnetic material makes the cantilever sensitive to the magnetic field, such that the cantilever is configured to move between first and second states. The switch also includes contacts supported by the support structure. When the magnet moves relative to the sensor, the cantilever interacts with a respective one of the contacts based on the position of the magnet during movement.

Further embodiments of the present invention provide a directionally insensitive proximity sensor that includes a substrate, a first switch, and a second switch. The first switch includes a first moveable section and a second section having magnetically sensitive material formed on the substrate and having a first longitudinal axis. The second switch includes a first moveable section and a second section having magnetically sensitive material formed on the substrate and having a second longitudinal axis. The first and second longitudinal axes can be positioned at an angle with respect to each other.

In one aspect of the present invention, the first and second switches can be reed switches.

Embodiments of the present invention provide a directionally insensitive proximity sensor including a switch having four sections of magnetically sensitive material and a cantilever having a magnetically sensitive material formed thereon. At least one of the switch and the cantilever closes a contact in response to a presence of a permanent magnet.

In one aspect of the present invention, the switch can be a reed switch.

In another aspect of the present invention, the sensor can have a simple driving circuit.

In another aspect of the present invention the sensor's switching mechanism requires only ultra-low power for sensing.

In another aspect of the present invention the sensor's accuracy and sensitivity can be modified for each individual user's requirements.

In another aspect of the present invention the sensor can easily be used to form one, two, and/or three-dimensional arrays of sensors on a single substrate to detect multiple discrete ranges, directions, and other parameters.

In another aspect of the present invention the sensor is very small, about 1×1 $mm^2$ or smaller.

In another aspect of the present invention the sensor can be fabricated using MEMS or laminate technology, which would make it easy to integrate with other integrated circuits and on a variety of substrates.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
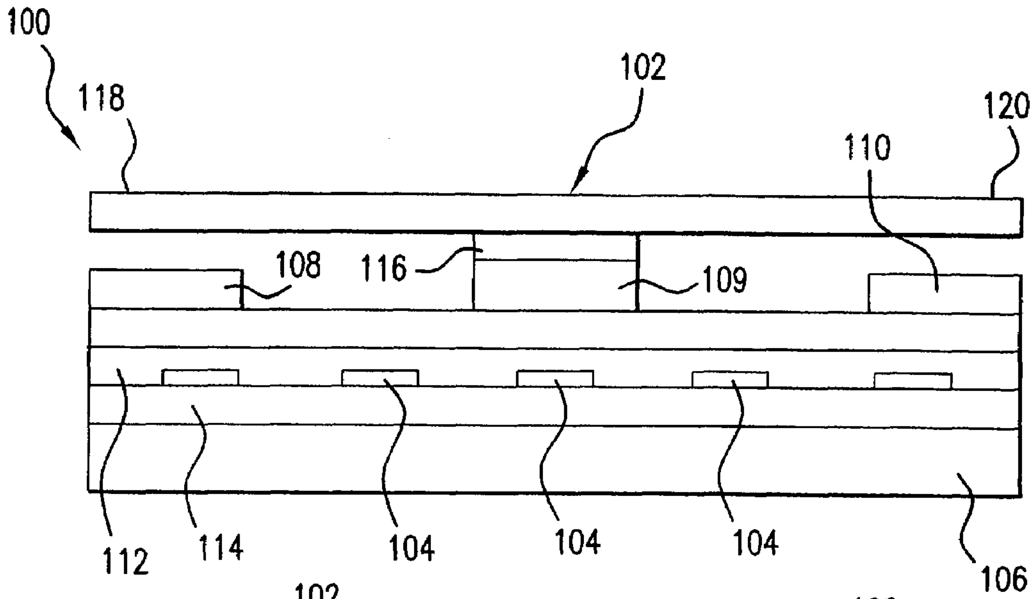
FIG. 1 is a side view of a micro-magnetic proximity sensor according to embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Embodiments of the present invention provide a micro magnetic proximity sensor including a magnet for producing a magnetic field, a fixed contact, and a cantilever having magnetic material positioned therein to produce a torque on the cantilever in the magnetic field. The magnet can be fixedly mounted adjacent the cantilever, it can be mounted as, or in addition to, the magnetic material positioned in the cantilever, or it can be moveably mounted external to the micro magnetic proximity sensing apparatus. Similar sensors are disclosed in U.S. application Ser. No. 10/058,940, entitled "Micro Magnetic Proximity Sensor Apparatus and Sensing Method," filed Jan. 28, 2002 and U.S. Prov. App. No. 60/332,841, entitled "Magnetic Proximity Sensors," filed Sep. 17, 2001, which are both incorporated herein by reference in their entirety.

It should be appreciated that the particular implementations shown and described herein are examples of the invention and are not intended to otherwise limit the scope of the present invention in any way. Indeed, for the sake of brevity, conventional electronics, manufacturing, MEMS technologies and other functional aspects of the systems (and components of the individual operating components of the systems) may not be described in detail herein. Furthermore, for purposes of brevity, the invention is frequently described herein as pertaining to a micro-electronically-machined proximity sensor for use in electrical or electronic systems. It should be appreciated that many other manufacturing techniques, such as lamination techniques, could be used to create the proximity sensor described herein, and that the techniques described herein could be used in mechanical proximity sensors, optical proximity sensors or any other switching device. Further, the techniques would be suitable for application in electrical systems, optical systems, consumer electronics, industrial electronics, wireless systems, space applications, or any other application. Moreover, it should be understood that the spatial descriptions (e.g., "above", "below", "up", "down", etc.) made herein are for purposes of illustration only, and that practical proximity sensors may be spatially arranged in any orientation or manner. Arrays of these proximity sensors can also be formed by connecting them in appropriate ways and with appropriate devices.

FIG. 1 shows a device 100 according to embodiments of the present invention. Device 100 can be a micro-magnetic proximity sensor. The device 100 comprises a cantilever or lever 102, a permanent magnet 106, and plural electrical contacts 108, 109, and 110. In embodiments of the present invention the device can also include a planar coil 104. The lever 102 can be a multi-layer composite consisting, for example, of a soft magnetic material (e.g., NiFe permalloy) on a top surface and a highly conductive material, such as Au, on a bottom surface. The lever 102 can comprise additional layers, and can have various shapes. The coil 104, according to embodiments requiring a coil, can be formed in an insulative layer 112 on a substrate 114.

In one configuration, the lever 102 is supported by lateral torsion flexure 116. The flexure 116 can be electrically conductive and form part of the conduction path when the switching section of the proximity sensor 100 is closed. The contact ends 118 and 120 of the lever 102 can be deflected up or down either by applying a temporary current through the coil 104 or based on the sensor 100 detecting an external object or magnet, discussed in more detail below. When an end 118/120 is in the "down" position, that end 118/120 of the lever 102 makes electrical contact with one of the left 108 or right 110 conductors, respectively, and the switch is "on" (also called the "closed" state). When both of the contact ends 118 and 120 are in the "up" position, the switch is "off" (also called the "open" state). The permanent magnet 106 holds the lever 102 in either the "up" or the "down" position after switching, making the device a latching proximity sensor. In some embodiments, a current is passed through the coil 104 (e.g., the coil 104 is energized) only during a brief period of time to transition between the two states.

Figure 2A:
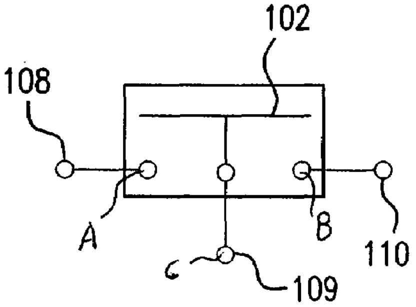
FIGS. 2A-2C illustrate symbols for three states of the proximity sensor of FIG. 1.
Figure 2B:
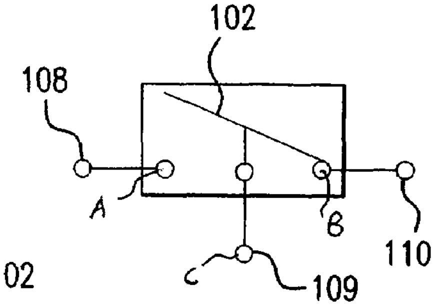
Figure 2C:
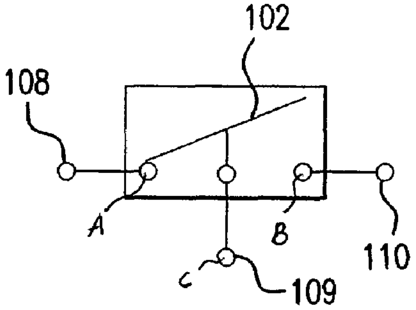

As seen in FIGS. 2A-2C, symbols of the proximity sensor 100 are shown representing the proximity sensor 100 in one of three states. In FIG. 2A, an O or Off state is shown, where all three terminals A, B, and C are isolated from each other. In FIG. 2B, an R or Right state is shown, where terminals C and B are shorted and terminals C and A are isolated from each other. In FIG. 2C, an L or Left state is shown, where terminals C and A are shorted and terminals C and B are isolated form each other.

Figure 6A:
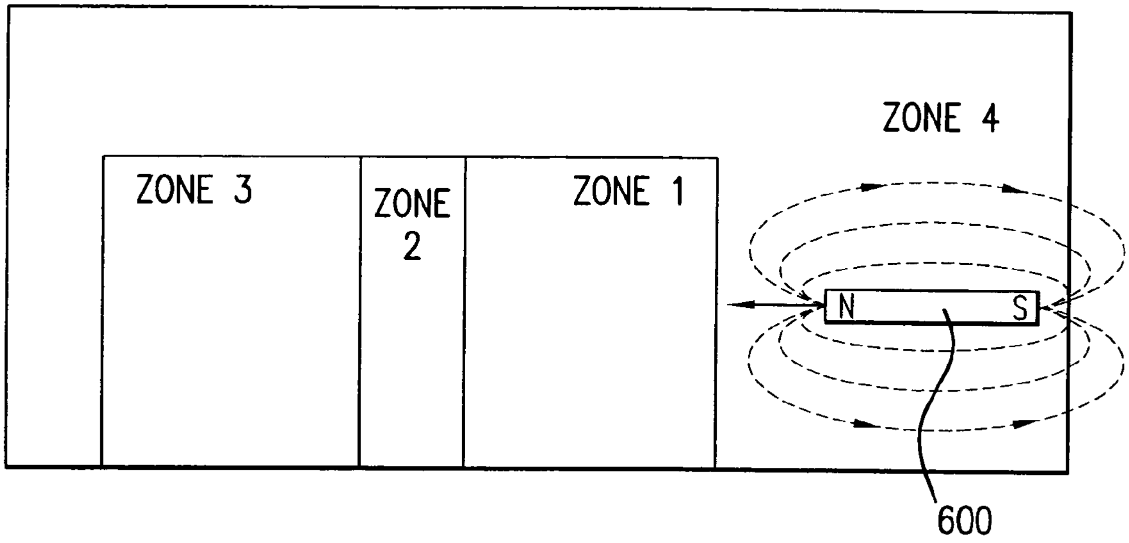
FIG. 6A-6B illustrate zones near the proximity sensor of FIG. 1.

As seen in FIG. 6A, when a magnet 600 is brought into the vicinity of the device 100, the device 100 can be switched to one of the three states depending not only on the magnet-sensor distance, but also on the specific location and magnetic orientation. Table 1 summarizes the various sensor states corresponding to the location of the magnet 600 (Zone 1, 2, 3, or 4), assuming the magnet 600 has a North-South orientation as shown in FIG. 6A. Although a magnet 600 (and 602 in FIG. 6B) is used in the description above and below, it is to be appreciated the device 100 can detect any magnetic or soft magnetic device with or without a magnetic field, such as a ferromagnetic material or the like.

TABLE 1

| Sensor States | |
|---|---|
| Magnet Location | Sensor State |
| 4 | O |
| 1 | R |
| 2 | O |
| 3 | L |

Figure 3:
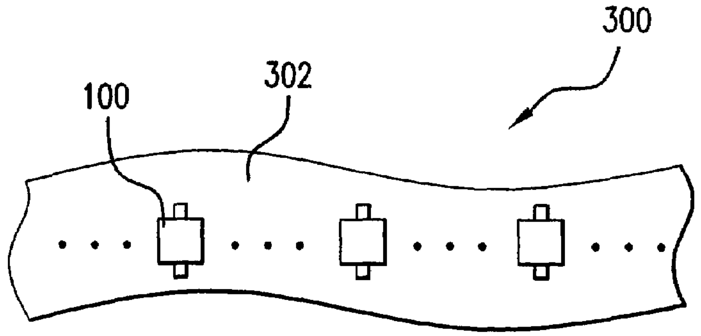
FIG. 3 illustrates a one-dimensional array of the proximity sensor of FIG. 1.

FIG. 3 shows a linear or one-dimensional array 300 of the devices 100 that can be coupled to a holder surface 302 according to embodiments of the present invention. This configuration allows for detection of movement of the magnet 600. For example, if O, R, O, L, O is detected, then the magnet 600 is moving from right to left. As another example, if O, L, O, R, O is detected, then the magnet 600 is moving from left to right. Hence, the directionality can be detected. Also, the sequential signals generated in each sensor 100 or sensor array discussed above or below can be analyzed for velocity, acceleration, deceleration, etc. of the magnet 600. For example, the time lapse between R and L states of one sensor can be used to calculate the velocity of moving magnet 600.

Figure 4:
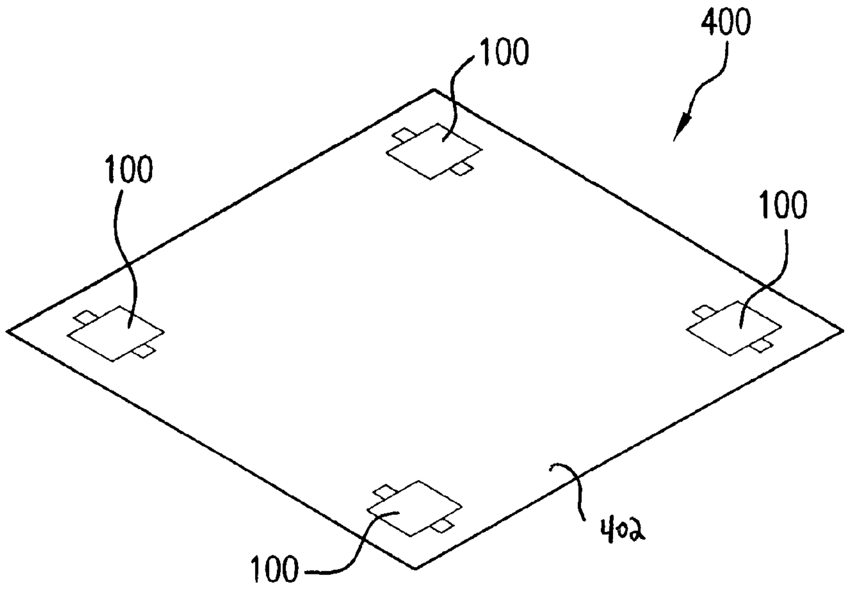
FIG. 4 illustrates a two-dimensional array of the proximity sensor of FIG. 1.
Figure 5:
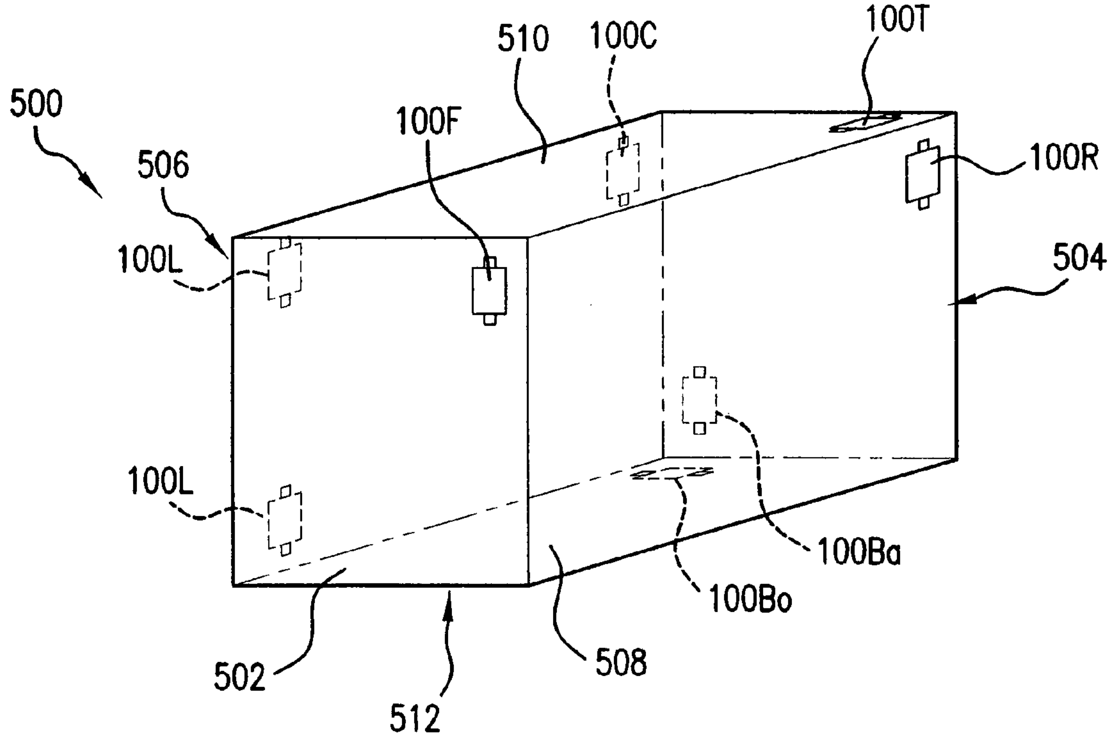
FIG. 5 illustrates a three-dimensional array of the proximity sensor of FIG. 1.

FIGS. 4-5 show other embodiments according to the present invention, including a two-dimensional array 400 and three-dimensional array 500, respectively, of the devices 100. In FIG. 4, the two-dimensional array 400 of periodically or non-periodically spaced devices 100 on holding surface 402 can detect movement of an external magnet in both the X and Y directions to provide more information for proximity detection. In FIG. 5, the array 500 includes front devices 100F on a front surface 502, back devices 100Ba on a back surface 504 (shown in phantom), left devices 100L on a left surface 506 (shown in phantom), right devices 100R on a right surface 508, top devices 100T on a top surface 510, and bottom devices 100Bo on a bottom surface 512 (shown in phantom). The devices 100 can be arranged either periodically or non-periodically. Hence, through the arrangement of the array 500, detection of an external magnet can be made in the X, Y, and Z directions to provide more information for proximity detection. Some examples of additional characteristics can be velocity, acceleration, directivity, deceleration, etc.

It is to be appreciated that the configurations shown in FIGS. 3-5 are for illustrative purposes only. Other two-dimensional and three-dimensional configurations will become apparent to persons skilled in the relevant art.

Figure 6B:
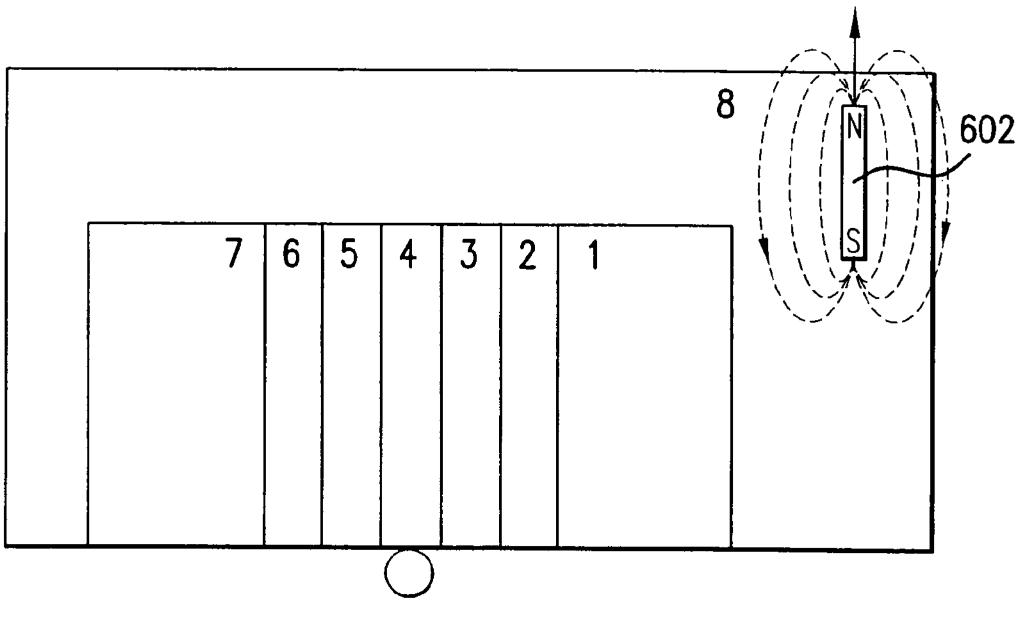

Turning to FIG. 6B, an embodiment is shown when a magnet 602 is brought into vicinity of the sensor 100. The sensor 100 can be switched to one of the three states in FIGS. 2A-2C depending not only on the magnet-sensor distance, but also on the specific location and magnet orientation. Table 2 summarizes the various sensor states corresponding to the location (Zones, 1, 2, 3, 4, 5, 6, 7, and 8) of the magnet 602, assuming the magnet 602 has a vertical North-South orientation as shown in FIG. 6B.

TABLE 2

| Magnet Location | Sensor State | Explanation |
|---|---|---|
| 8 | O | Magnet is too far away from sensor so that its field strength is too weak to affect the lever. |
| 1 | R | Lever aligns with the field line and tilts to the right |
| 2 | O | Lever aligns with the horizontal field line and becomes level |
| 3 | L | Lever aligns with the field line and tilts to the left |
| 4 | O | Lever aligns with the center line of the magnet and the field effects on the two sides cancel each other |
| 5 | R | Lever aligns with the field line and tilts to the right |
| 6 | O | Lever aligns with the horizontal field line and becomes level |
| 7 | L | Lever aligns with the field line and tilts to the left |

Figure 7A:
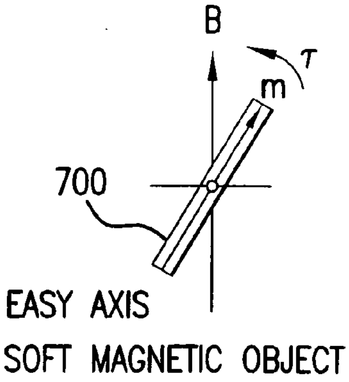
FIGS. 7A-7B illustrate counterclockwise and clockwise torque of a magnetic object according to embodiments of the present invention.
Figure 7B:
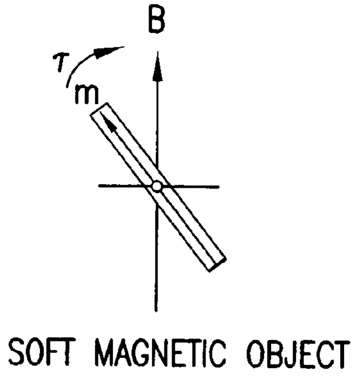

FIGS. 7A-7B show a soft magnetic object 700 within a magnetic field according to embodiments of the present invention. A soft magnetic object 700 with a preferential magnetization axis (easy axis) tends to align with the external magnetic field. This is because the external magnetic field (B) induces a magnetization (m) along the easy axis such that a torque ($\theta = m \times B$) is produced to minimize the total magnetic energy. In the orientation shown, in FIG. 7A a counterclockwise torque is produced, while in FIG. 7B a clockwise torque is produced.

Figure 8:
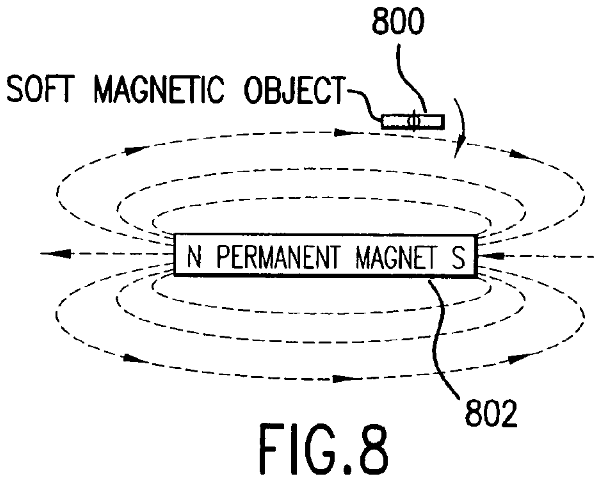
FIG. 8 illustrates a first magnetic object with clockwise torque caused by a field of a second magnetic object according to embodiments of the present invention.

FIG. 8 shows a location of a small soft magnetic object 800 (rectangular shaped object) in a magnetic field produced by a permanent magnet 802 according to embodiments of the present invention. The magnetic field can be used to determine the magnetic torque on the object 800. The object can be a cantilever on a sensing device (e.g., a proximity sensor). In this figure, a clockwise torque is produced on the object 800 until the object's long axis approximately aligns with the field lines.

Figure 9:
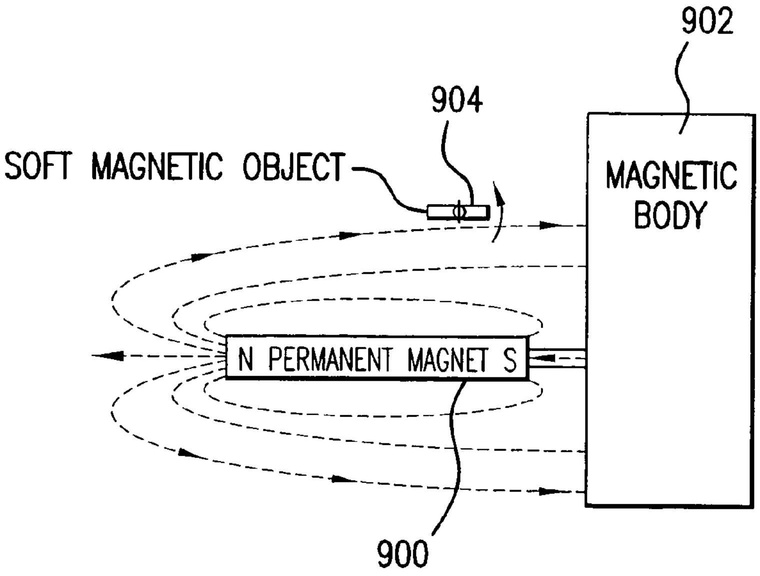
FIG. 9 illustrates a first magnetic object with a counterclockwise torque caused by fields of second and third magnetic objects according to embodiments of the present invention.

FIG. 9 shows the magnetic field produced according to embodiments of the present invention. The magnetic field is produced when a permanent magnet 900 is perturbed by the presence of a magnetic body 902 in proximity. This can cause an object 904, which can be a cantilever of a sensing device, to realign with the new field lines. In this case, a counterclockwise torque is produced on the object 904.

Figure 10:
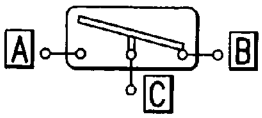
FIGS. 10-11 show symbols for a proximity sensor according to embodiments of the present invention.
Figure 11:
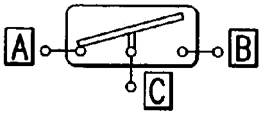

As can be seen, a state of a symbol of a proximity sensor in FIG. 10 is similar to the state of the symbol of the proximity sensor in FIG. 2B. Similarly, a state of a symbols of a proximity sensor in FIG. 11 is similar to the state the symbol of the proximity sensor in FIG. 2C.

Figure 12A:
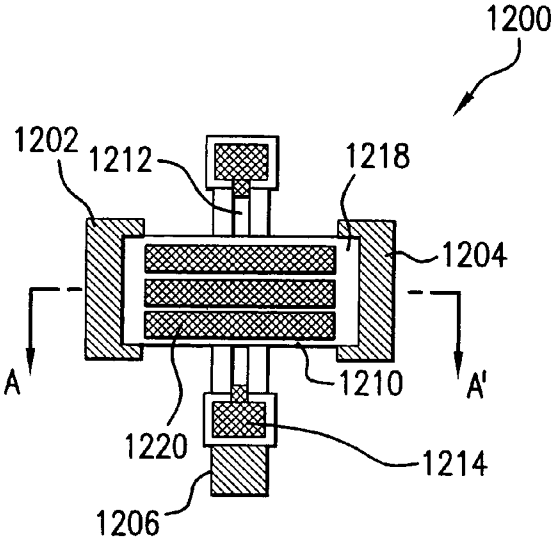
FIG. 12A shows a top view of a proximity sensor according to embodiments of the present invention.
Figure 12B:
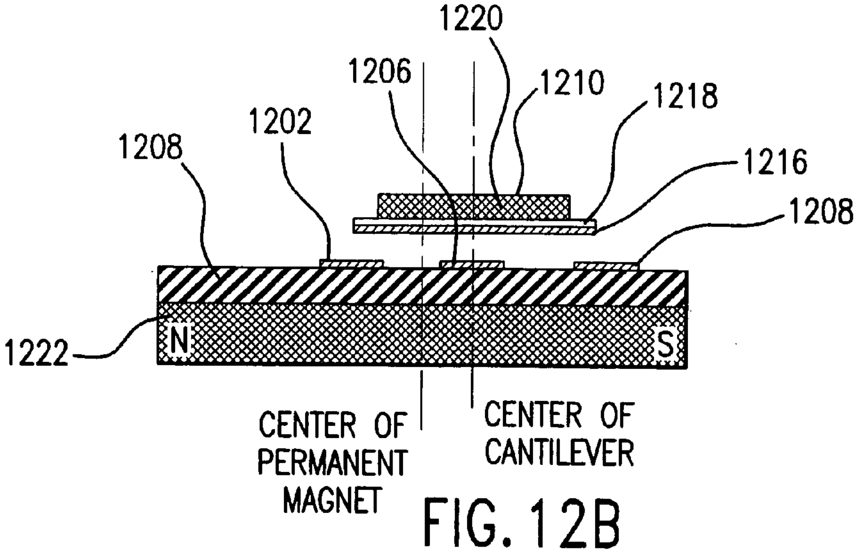
FIG. 12B shows a cross-sectional view of the magnetic proximity sensor looking into the sensor at line A-A of FIG. 12A.

FIGS. 12A-12B are schematic drawings of other embodiments of a device 1200, which can be a magnetic proximity sensor. The device 1200 consists of bottom conductors 1202, 1204, and 1206 fabricated on a suitable (electrically insulating) substrate 1208, a cantilever 1210 supported by torsion springs 1212 with bases 1214 on the substrate 1208. The cantilever 1210 has a bottom conducting layer 1216, a thin structural material 1218, and thick soft magnetic materials 1220. The bottom conductor 1216 is electrically connected to the bottom conductor 1206 through the torsion springs 1212. The bottom conductors 1202 and 1204 are coated with a dielectric layer so that conductor 1216 will not short to the conductors 1202 and 1204. The cantilever 1210 can rotate about the torsion spring 1212 under external influences (e.g., magnetic fields).

With reference again to FIGS. 9-11, and continuing reference to FIGS. 12A-12B, an exemplary operation of the sensor 1200 will be discussed, where merely for convenience the device 1200 is placed in the environment of FIG. 9. It is to be appreciated, the sensor 1200 can be placed in many other environments. The cantilever 1210, which can be positioned similar to 904, can rotate about the torsion spring 1212 under external influences (e.g., magnetic fields). A permanent magnet 1222 (having a lateral north-south orientation) is also attached to the substrate 1208 (or can be placed on top of the cantilever 1210). In this embodiment, the cantilever 1210 is designed to normally stay in the right-end-down state (FIG. 10). In the right-end-down state, the cantilever's right end is in contact with the bottom contact 1204 and forms a closed electrical path between 1204 and 1206. The electrical path between 1202 and 1206 is open. When an external magnetic body, for example 902, approaches from the right as illustrated in FIG. 9, the cantilever 1210 is flipped to the left-end-down state (FIG. 11) because of the magnetic field lines are altered in such a way a counterclockwise torque is produced on the cantilever 1210. In the left-end-down state, the cantilever's left end is in contact with the bottom contact 1202 and forms a closed electrical path between 1202 and 1206. The electrical path between 1204 and 1206 is open. The flexibility (stiffness) of the torsion springs 1212 and the strength and placement of the permanent magnet 1222 can be designed to have different sensitivity to the distance of the external magnetic body, for example 902.

Figure 13:
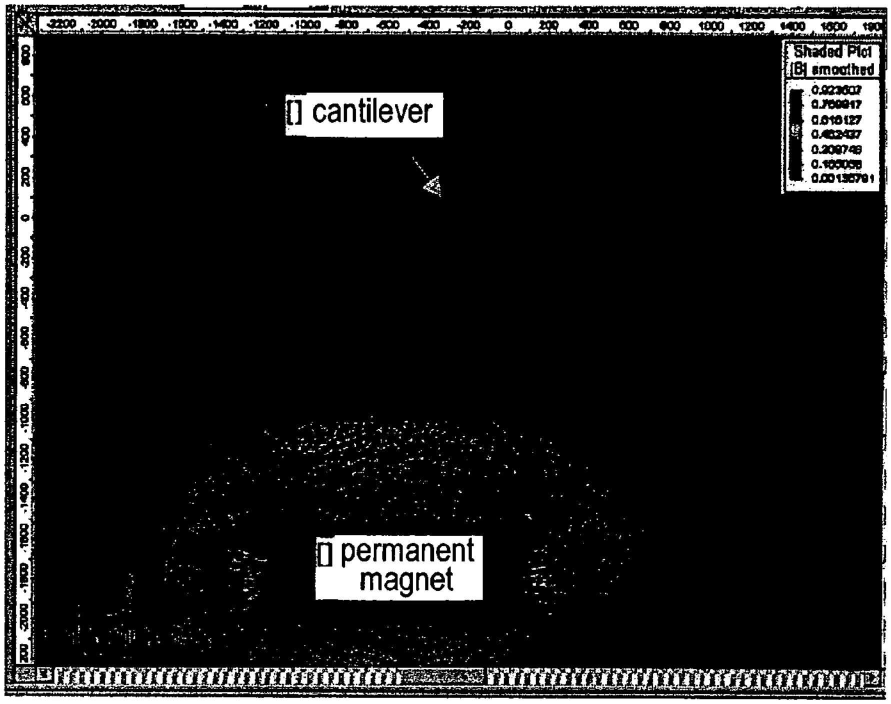
FIG. 13 shows results of a simulation where an external magnetic object is not present or far away from the proximity sensor in FIG. 12A.

FIG. 13 shows simulation results when the external magnetic object, for example 902, is not present or far away from the sensor 1200. The cantilever 1210 is off-center to the right of the center of the magnetic field produced by the permanent magnet 1222 such that a clockwise toque is produced on the cantilever 1210 (the cantilever 1210 tends to align with the external field lines).

Figure 14:
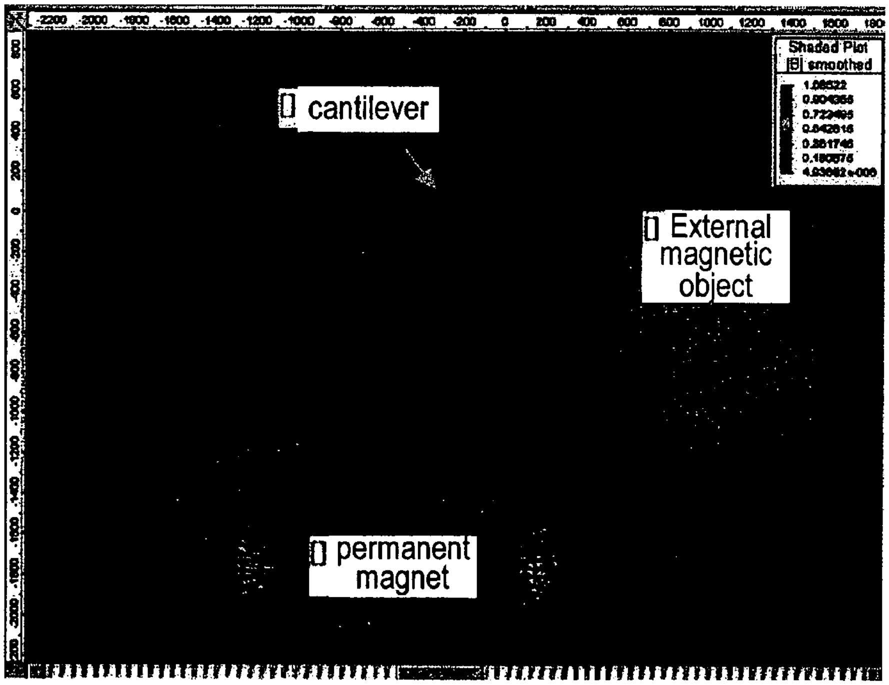
FIG. 14 shows results of a simulation where an external magnetic object is in proximity of the proximity sensor in FIG. 12A.

FIG. 14 shows simulation results when the external magnetic object, for example 902, is in proximity to the sensor assembly 1200. The external magnetic object, for example 902, perturbs the magnetic field lines in such a way such that the cantilever 1210 flips to the left (counterclockwise torque). Note the changes in the magnetic flux lines in FIG. 14 compared to those in FIG. 13.

Figure 15:
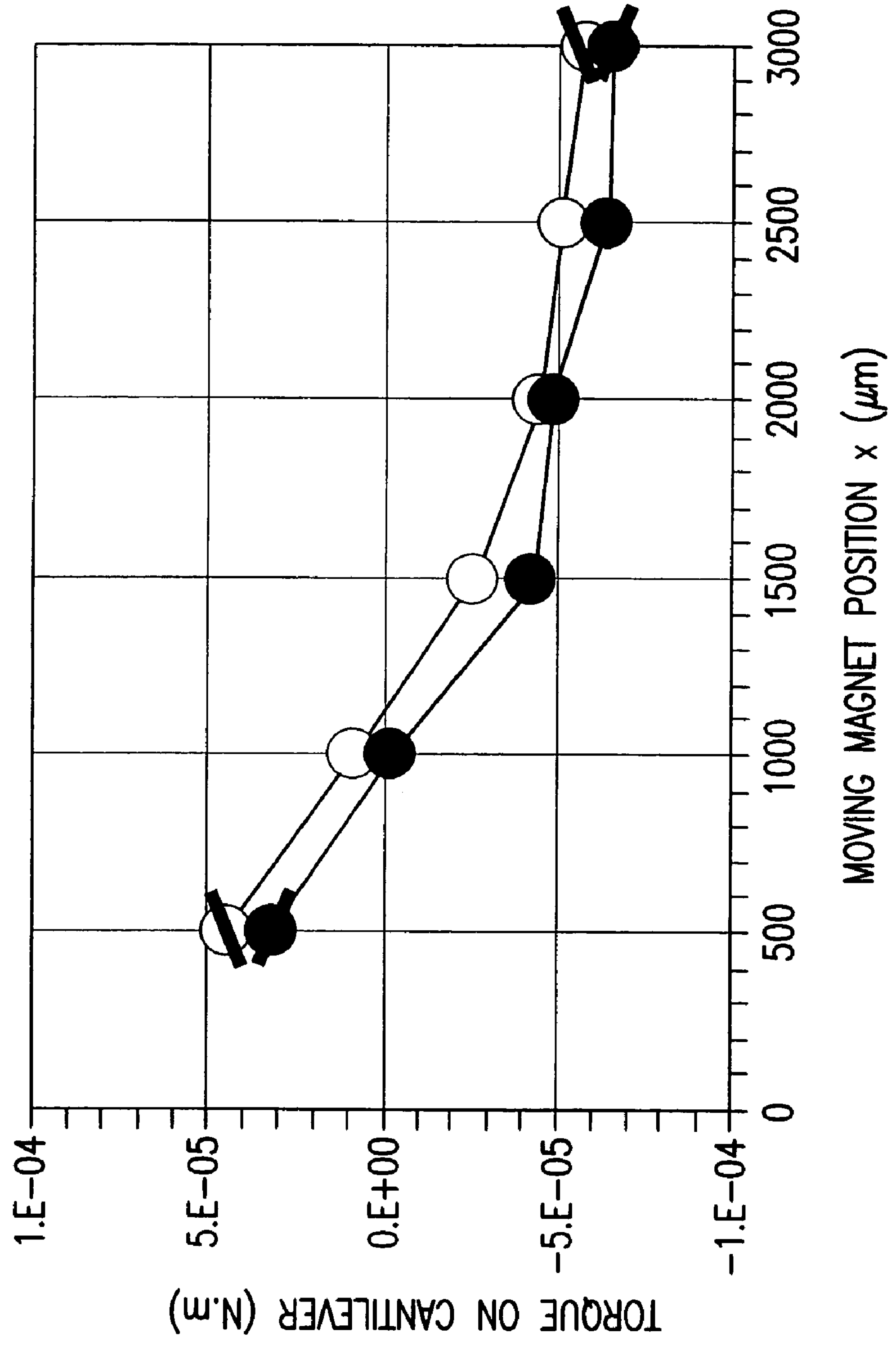
FIG. 15 shows a graph of a torque on a cantilever in the proximity sensor of FIG. 12A corresponding to the simulations in FIGS. 13-14.

FIG. 15 shows simulation results of the torque on the cantilever 1210 corresponding to FIG. 14 as a function of the distance (x) of the external magnetic body, for example 902, to the cantilever 1210. By way of example, the torque can be negative (clockwise) when the distance x is approximately larger than 1000 μm, so that the cantilever 1210 stays in the right-end-down state (FIG. 10). In this example, the torque can become positive (counterclockwise) when x is approximately less than 1000 μm and the cantilever 1210 is flipped to the left-end-down state (FIG. 11). Also in this example, the open (cantilever 1210 is rotated about 2 degrees counterclockwise from the leveled position) and closed (cantilever 1210 is rotated 2 degrees clockwise from the leveled position) symbols represent the state of the cantilever during the simulation. Note that the sign and magnitude of the torque depend weakly on the small (e.g., 2 degrees) rotation angle, and the cantilever 1210 should stay in the respective state once flipped.

Figure 16B:
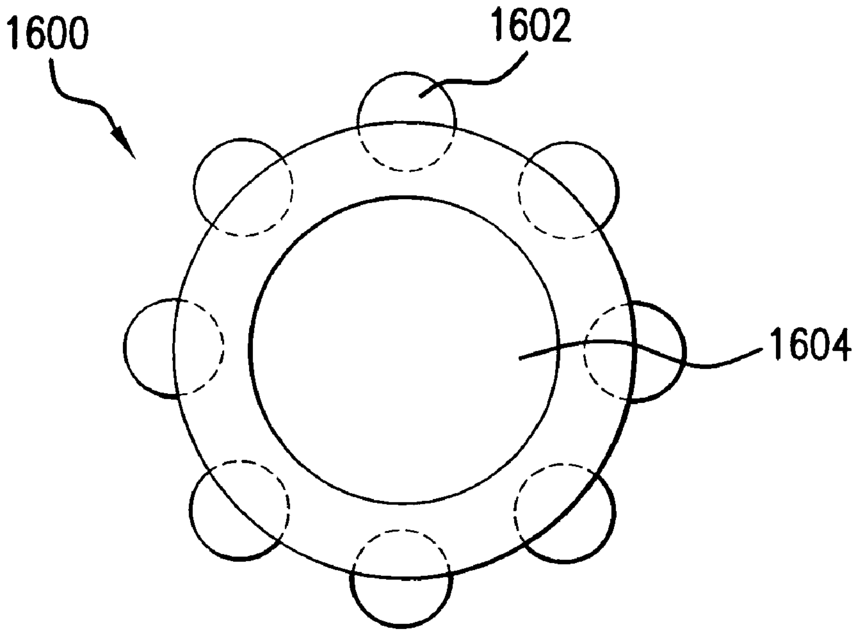
FIG. 16B illustrates a proximity sensor with multiple contacts for capacitance sensing according to embodiments of the present invention.
Figure 16A:
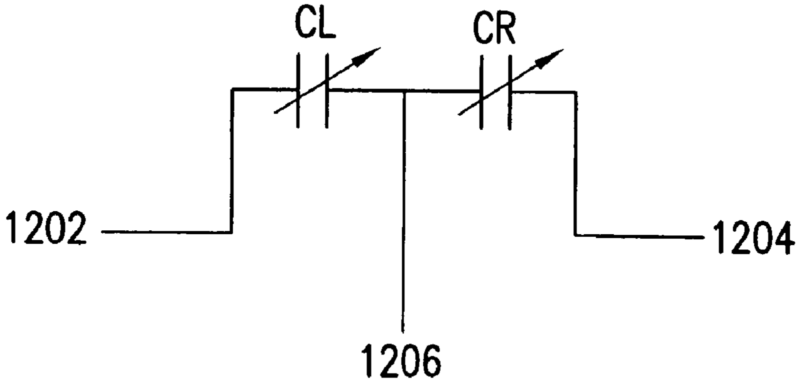
FIG. 16A illustrates an equivalent circuit for the proximity sensor in FIGS. 1 and 12A.

Turning now to FIG. 16A, the pair of conductors 1202 and 1206 can form an equivalent variable capacitor $C_L$ and the pair of conductors 1204 and 1216 forms another equivalent variable capacitor $C_R$. Thus, continuing the discussion based on utilizing sensor 1200 in the environment of FIG. 9, when an external magnet, for example 902, approaches the sensor 1200, the cantilever 1210 tends to align with the magnetic field lines associated with the external magnet, for example 902. This causes the cantilever 1210 to tilt to various positions, which changes the capacitance $C_L$ and $C_R$. By properly sensing the capacitance values, relative locations between the sensor 1200 and the external magnet, for example 902, can be determined. The flexibility (stiffness) of the torsion springs 1212 can be designed to have different magnetic field sensitivity.

In FIG. 16B, an embodiment of a proximity sensor 1600 is shown that exhibits the same principle as discussed above for FIGS. 12-16A. A main difference between the sensor 1200 and the sensor 1600 is that the sensor 1600 includes multiple equivalent capacitor pairs between the cantilever 1210 and bottom conductors or contacts 1602. A center metal contact and support are located below the plate (1604). This allows for better detection of distance, velocity, acceleration, and other characteristics.

Figure 17:
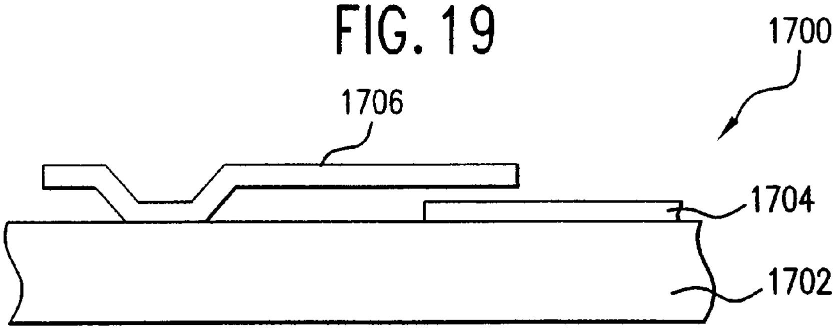
FIG. 17 shows a side view of a reed switch according to embodiments of the present invention.
Figure 18:
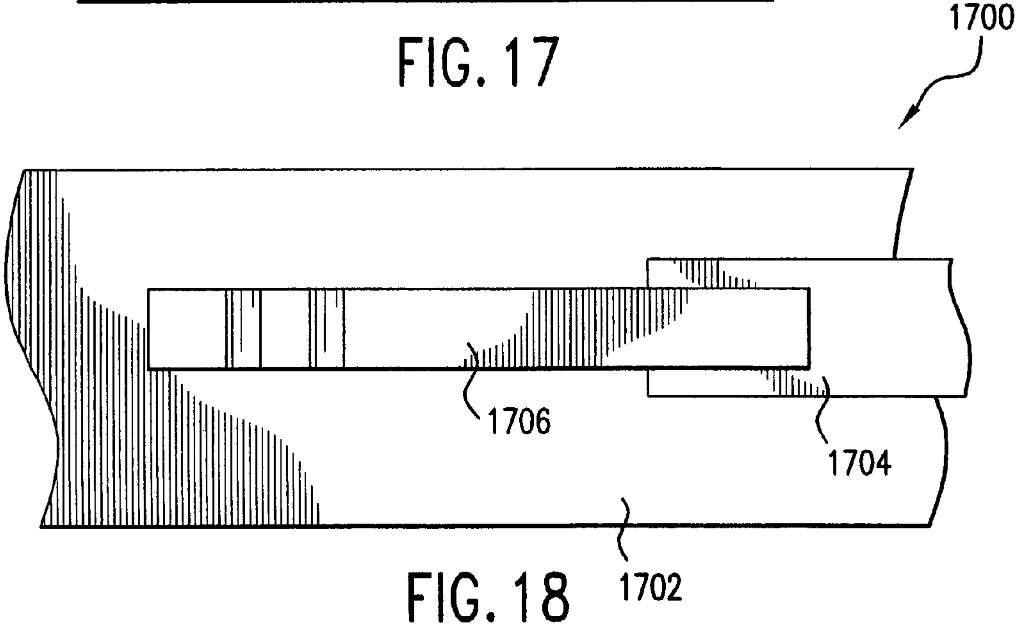
FIG. 18 shows a top view of the reed switch in FIG. 17.

FIGS. 17 and 18 show a side view and a top view, respectively, of a sensor (e.g., a reed switch) 1700 according to an embodiment of the present invention. Reed switch 1700 includes a support structure (e.g., a substrate) 1702, a conductor (e.g., a contact) 1704 coupled to support structure 1702, and a moveable portion (e.g., a cantilever) 1706 coupled to support structure 1702 that interacts with contact 1704. Example reed switches and their basic functionality can be found in Gueissaz, F. and Piguet, D., "The Microreed, an Ultra-Small Passive MEMS Magnetic Proximity Sensor Designed for Portable Applications," *IEEE,* 2001, pages 269-273, and U.S. Pat. No. 5,605,614 to Bornand, U.S. Pat. No. 6,040,748 to Gueissaz, and U.S. Pat. No. 5,430,421 to Bornand et al., which are all incorporated by reference herein in their entireties. Basically, a presence of a magnetic field causes cantilever 1706 to bend toward or away from contact 1704 to open or close a switch. This causes a signal to be generated that the magnet is in the proximity of the sensor or switch.

Figure 19:
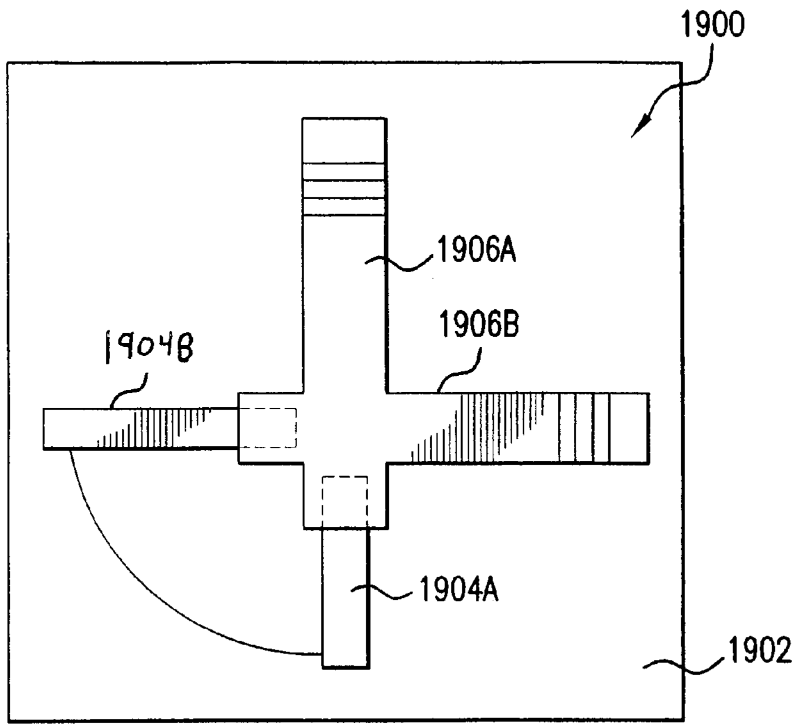
FIG. 19 shows a top view of a reed switch according to embodiments of the present invention.

FIG. 19 shows a top view of a sensor (e.g., a reed switch) 1900 according to embodiments of the present invention. Switch 1900 is similar to switch 1700, except it includes two switch portions. A first switch portion includes a first, moveable section 1906A and a second, stationary section 1904A. Second section 1904A can have magnetically sensitive material formed on substrate 1902 and has a first longitudinal axis. A second switch portion includes a first, moveable section 1906B and a second, stationary section 1904B. Second section 1904B can have magnetically sensitive material formed on substrate 1902 and has a second longitudinal axis. Second section 1904B can be coupled to second section 1904A, such that their longitudinal axes are positioned at an angle with respect to each other. First section 1906A can be made integral with first section 1906B. In this arrangement, switch 1900 can detect position, direction, velocity, acceleration, etc., of a magnet in at least two directions as it becomes proximate switch 1900.

Figure 21:
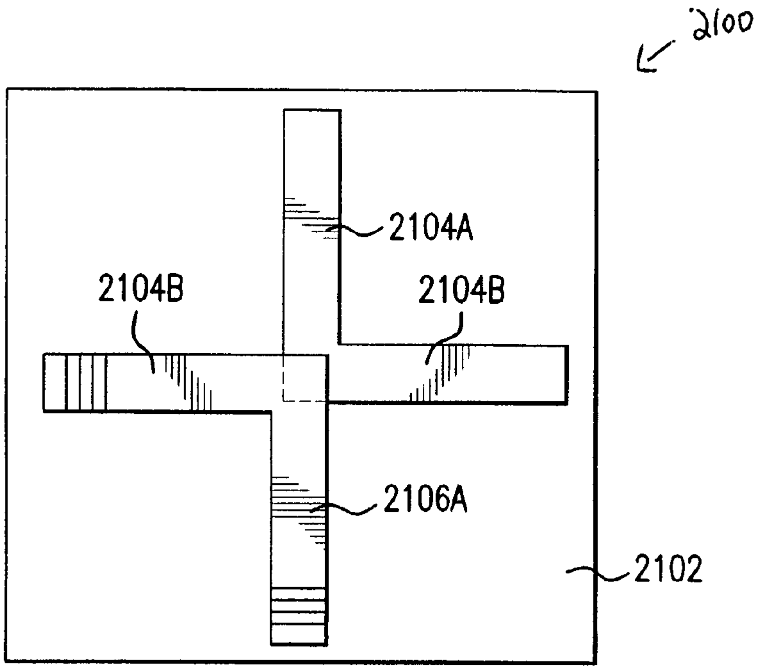
FIG. 21 shows a top view of a reed switch according to embodiments of the present invention.
Figure 20:
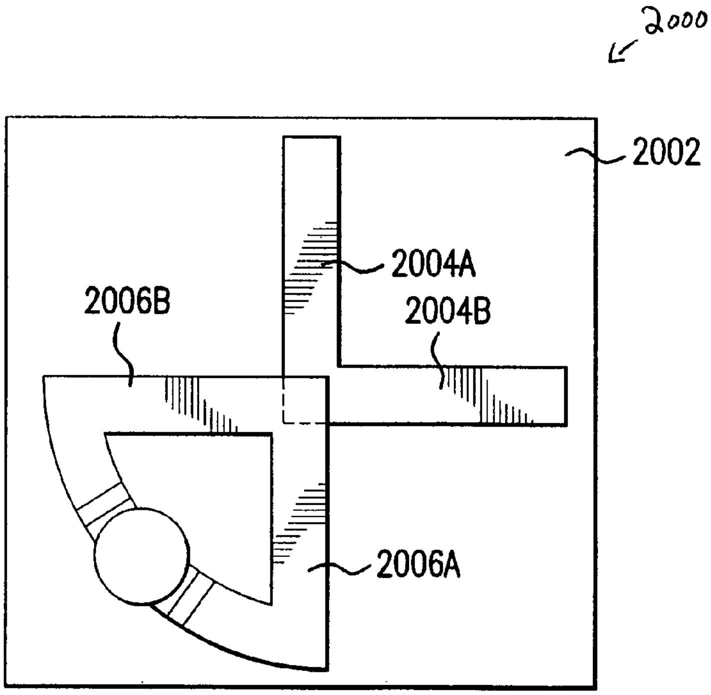
FIG. 20 shows a top view of a reed switch according to embodiments of the present invention.

FIGS. 20 and 21 show top views of sensors (e.g., reed switches) 2000 and 2100, respectively, according to embodiments of the present invention. Sensors 2000 and 2100 are functionally similar to sensor 1900, except second sections 2004A and 20004B and 2104A and 2104B are integral, and not just coupled. Sensor 2000 includes two switch portions formed on a substrate 2002. A first switch portion includes a first, moveable section 2006A and a second, stationary section 2004A. A second switch portion includes a first, moveable section 2006B and a second, stationary section 2004B. Sensor 2100 includes two switch portions formed on a substrate 2102. A first switch portion includes a first, moveable section 2106A and a second, stationary section 2104A. A second switch portion includes a first, moveable section 2106B and a second, stationary section 2104B.

The use of Reed switches as a sensing device, or any other passive magnetostatic sensing MEMS device, are desired in applications where size and power are limited. This is because these sensing devices require very low relative power and require very low relative contact forces between a cantilever and a contact pad.

It is to be appreciated that in various embodiments both a sensor and an object associated with a permanent magnet can be moving. It is also to be appreciate that in various embodiments either one of the sensor or the object can be stationary, while the other one of the sensor or the object would be moving.

Conclusion

The corresponding structures, materials, acts and equivalents of all elements in the claims below are intended to include any structure, material or acts for performing the functions in combination with other claimed elements as specifically claimed. Moreover, the steps recited in any method claims may be executed in any order. The scope of the invention should be determined by the appended claims and their legal equivalents, rather than by the examples given above. Finally, it should be emphasized that none of the elements or components described above are essential or critical to the practice of the invention, except as specifically noted herein.

What is claimed is:

1. A proximity sensing system comprising: a magnet producing a magnetic field; and a sensor having a switch, the switch including, a cantilever, supported by a supporting structure, having a magnetic material and a longitudinal axis, the magnetic material making the cantilever sensitive to the magnetic field, such that the cantilever is configured to move between first and second states, and contacts supported by the support structure, wherein when the magnet moves relative to the sensor, the cantilever interacts with a respective one of the contacts based on the position of the magnet during movement.

2. The system of claim 1, wherein the switch is configured as a micro-magnetic switch.

3. The system of claim 2, wherein the switch is a latching micro-magnetic switch.

4. The system of claim 1, wherein a position of an object associated with the magnet is determined based on signals generated when the cantilever interacts with one or more of the respective one of the contacts.

5. The system of claim 1, wherein a distance between an object associated with magnet and the sensor is determined based on signals generated when the cantilever interacts with one or more of the respective one of the contacts.

6. The system of claim 1, wherein a velocity of an object associated with the magnet with respect to the switch is determined based on signals generated when the cantilever interacts with one or more of the respective ones of the contacts.

7. The system of claim 1, wherein an acceleration of an object associated with the magnet with respect to the switch is determined based on signals generated when the cantilever interacts with one or more of the respective ones of the contacts.

8. The system of claim 1, wherein a direction of an object associated with the magnet with respect to the switch is determined based on signals generated when the cantilever interacts with one or more of the respective ones of the contacts.

9. A system of claim 1, wherein the sensor includes an array of the switches.

10. The system of claim 1, wherein the sensor includes a one-dimensional array of the switches.

11. The system of claim 1, wherein the sensor includes a two-dimensional array of the switches.

12. The system of claim 1, wherein the sensor includes a three-dimensional array of the switches.

13. The system of claim 1, wherein the switch is configured as a reed switch.

14. The system of claim 1, wherein pairs of adjacent ones of the contacts form equivalent variable capacitors and wherein a position of the magnet is determined based on changes in capacitance of the capacitors.

* * * * *